United States Patent [19]

Kuntz et al.

[11] 4,308,295

[45] Dec. 29, 1981

[54] PROCESS FOR PREPARING A PRE-COOKED FROZEN RICE PRODUCT

[75] Inventors: James T. Kuntz, Putnam Valley; Charles R. Mason, Yonkers; Roger Williams, Tarrytown; Alan F. Hendrix, Peekskill, all of N.Y.

[73] Assignee: General Foods Corporation, White Plains, N.Y.

[21] Appl. No.: 864,409

[22] Filed: Dec. 27, 1977

[51] Int. Cl.$^3$ .......................... A23L 1/168; A23L 3/36
[52] U.S. Cl. ................................. 426/618; 426/462; 426/524
[58] Field of Search ............... 426/618, 524, 463, 508, 426/444, 627, 462

[56] References Cited

U.S. PATENT DOCUMENTS

| | | | |
|---|---|---|---|
| 2,021,721 | 11/1935 | Gibbon | 426/444 |
| 2,278,472 | 4/1942 | Musher | 426/442 |
| 2,813,796 | 11/1957 | Keneaster et al. | 426/444 |
| 2,938,802 | 5/1960 | Miller | 426/618 |
| 3,113,032 | 12/1963 | Wayne | 34/5 |
| 3,189,461 | 6/1965 | Ozai-Durrani | 426/461 |
| 3,526,511 | 9/1970 | Rockland | 426/461 |
| 4,042,717 | 8/1977 | Gayte | 426/508 |

FOREIGN PATENT DOCUMENTS 7714300  11/1974  Japan ..................................... 426/462

*Primary Examiner*—Raymond N. Jones
*Assistant Examiner*—Elizabeth A. Hatcher
*Attorney, Agent, or Firm*—Mitchell D. Bittman

[57] ABSTRACT

A superior frozen rice product is produced by hydrating a parboiled rice, quick-cooling the hydrated rice followed by fast-freezing the cooled rice.

13 Claims, No Drawings

PROCESS FOR PREPARING A PRE-COOKED FROZEN RICE PRODUCT

BACKGROUND

Generally rice available in the marketplace is in the dry state and in order to be prepared for consumption must be either hydrated (e.g., parboiled rice) or hydrated and gelatinized (e.g., ordinary long grain rice) by cooking in boiling water for at least about 12-25 minutes. This preparation of rice not only involves long cooking periods which reduces the ease of preparation and hence, the desirability of the product, but other difficulties in the preparation can result in an undesirable product. Over or under cooking, use of too little or too much water, incorrect cooking temperatures and times, etc., can result in a sticky and gummy rice product wherein the rice grains adhere to each other or wherein the texture of the rice is either too firm or too soft and mushy. Even with proper preparation some precooked rices (e.g. some instant or precooked frozen rices) generally will still exhibit undesirable characteristics (e.g. inferior texture, stickiness, etc.).

Accordingly, it is an object of the invention to provide a process for producing a rice product which involves easy and quick preparation resulting in a rice which exhibits distinct grains with a firm but tender texture, but without mushy, soft, sticky or gummy characteristics.

Another object of the invention is to provide a process for producing a rice product which possesses tolerance to preparation variations while still maintaining the desirable product characteristics.

SUMMARY

This invention relates to a process for producing a superior frozen rice product that requires reheating prior to serving wherein the quality of the rice is comparable to that obtained by properly cooking long grain rice but has the added benefit in that the grains are distinct and well-rounded and have a firm but tender texture but without soft, mushy, sticky or gummy characteristics. Briefly, the process comprises hydrating a parboiled rice at a temperature greater than about 150° F. to a moisture content of about 55–70%, then quick-cooling the hydrated rice to a temperature between about 35° F. and 95° F., followed by fast-freezing the cooled rice to a temperature less than about 20° F.

DETAILED DESCRIPTION OF THE INVENTION

The process of this invention comprehends first hydrating a parboiled rice. Parboiled rice appropriate for this invention comprehends rice which has been parboiled as generally known in the art, wherein the starch in the rice has been gelatinized to at least 90% and the rice has been dried to a moisture content within the range of about 7–13%. One acceptable means of preparing parboiled rice involves cleaning rice, soaking the rice under pressure with water at 150–200° F., draining, then cooking with steam to gelatinize the rice starch to greater than 90%, following by hot air drying and milling. According to this invention, the parboiled rice is hydrated to a moisture content within the range of about 55–70%, preferably 61–68%. Hydration of the rice to above about 70% results in rice which is too soft, while hydration to below about 55% results in rice which is too firm for preparing the superior frozen rice product of this invention. The rice is hydrated at temperatures greater than about 150° F. and should generally be between about 150° F. to about 212° F., preferably 200° F.–212° F. Hydration at temperatures lower than about 150° F. would result in a rice with an inferior texture, a period of hydration which would be too long to be economically feasible, and difficultues controlling the degree of hydration of the rice. Preferably the hydration is carried out in a period of less than 60 minutes. Hydration may be accomplished by any means known in the art, e.g., immersing the parboiled rice in boiling water, steam cooking (in which case the temperature of hydration can be above 212° F.), etc. Optionally, ingredients such as buffers, water conditioners, etc. may be added to the water used to hydrate the parboiled rice to aid in the hydration of the rice.

After hydration the rice is then quickly cooled to a temperature between about 35° F. and 95° F., preferably between 40° F. and 80° F. The rice may be cooled by any means common in the art such as immersion into a chilled water (e.g., 40° F.) bath, spray cooling, evaporative cooling, etc. The rice should be cooled quickly following hydration in order to maintain the rice grain integrity, yield, and to prevent further hydration of the rice grains. The rice should be cooled within a period of less than about 30 minutes, preferably less than about 10 minutes following hydration of the rice. Dehydration of the rice during cooling, i.e. loss of more than about 5% of the moisture content of the rice, should be avoided. If the hydrated rice was to be frozen without this cooling step the rice would have a tendency to loose moisture during freezing, freeze in clumps, and the resultant rice when prepared for consumption would exhibit a loss of some of its superior texture and quality attributes. There is also a significant energy saving obtained when cooling prior to freezing.

After cooling the rice is then fast frozen to a temperature less than about 20° F., preferably less than 10° F. The rice may be frozen by any means, such as freezing with solid $CO_2$ (powdered dry ice), liquid nitrogen, liquid freon, or freezing utilizing freezer tunnels etc. The rice is fast frozen in order to prevent the formation of ice crystals in the rice sufficiently large to cause a significant amount of rupturing of the cells of the rice resulting in the loss of the superior texture and quality of the rice. The period of time for freezing the rice should be less than 30 minutes, preferably from 30 seconds to 10 minutes. Substantial dehydration of the rice, i.e. loss of more than about 5% of the moisture content of the rice, should be avoided during freezing. When the rice is frozen all the rice grains are preferably frozen separately, however when some of the rice grains are frozen in clumps, then it may become necessary to employ some sort of mechanical breaker to separate these rice grains. After fast freezing the rice can be stored. Preferably, the rice is stored at temperatures less than 10° F., basically for storage stability and to prevent loss by the rice of its superior texture and flavor.

To the frozen rice can be added other frozen vegetables (e.g., onions, mushrooms, spinach, beans, tomatoes, peppers, etc.) or fruits (e.g. nuts, raisins, coconut, etc.) and seasonings (e.g., soy sauce, monosodium glutamate, garlic powder, onion powder, salt, pepper, other spices, etc.), although the seasoning is preferably added separately to the heated rice due to the hydroscopic nature of most seasonings. The frozen rice product can be conveniently prepared for consumption by heating the frozen rice to serving temperature (e.g., about 150° F.–180° F.), generally in a period of about 5–8 minutes, thus obtaining a rice which is comparable in quality with properly cooked long grain rice but has the added benefit in that the grains are distinct and well rounded and have a firm but tender texture but without soft, mushy, sticky or gummy characteristics. The rice can be heated by any convenient means such as in an oven, a microwave or on the top of the stove. Generally, when heating the rice on the top of the stove a small amount of water and/or butter or margarine is added to the rice to prevent scorching of the frozen rice and to act as a heat transfer medium. The addition of a small amount of water may also be necessary depending on the seasonings which have been added to the rice.

An additional unexpected benefit of the frozen rice product prepared by the process of this invention is that the product possesses tolerance to preparation variations while still maintaining its superior quality, texture and flavor. Preparation variations such as delays of even up to one hour after heating the frozen rice followed by reheating the rice, or defrosting the rice then heating it, or adding too much or too little water to the rice prior to heating, etc., have not produced an undesirable product, in that the rice did not become sticky, mushy or gummy and the grains remained separate and distinct. A further benefit was that there was observed a slightly nutty pleasant flavor in the prepared rice product.

EXAMPLE

Long grain parboiled rice was poured into a continuous reel cooker which contained water at 210° F., in the ratio of one part rice to approximately four parts water. The parboiled rice was hydrated in the cooker for 18 minutes to 64% moisture, removed from the cooker, and then cooled to 55° F. by spraying with chilled water. Cooling was accomplished within 5 minutes following the hydration step so as to maintain rice grain integrity and yield, and to prevent further hydration of the rice grains. The rice was then drained of excess surface water by vibration on a mesh belt for approximately one minute. Freezing was accomplished by conveying the rice into a continous cold air updraft freezer where all rice grains were frozen separately to 0° F. within 5 minutes.

The frozen rice product obtained above was easily prepared for consumption by heating two cups of the rice with one third cup of water and one tablespoon of butter for 5–8 minutes to raise the temperature of the rice to 150° F.–180° F. which is the proper serving temperature for rice. The resulting rice from this invention had a slightly firm texture, and was neither sticky, mushy or gummy and had grains that were distinct and well-rounded, with a slightly nutty, pleasant flavor. Rice prepared according to this invention possessed extraordinary tolerance to preparation variations such as long holding times. Even with an extended delay of an hour after heating, followed by reheating the rice, the quality of this rice was maintained, in that it did not become sticky, mushy, or gummy and the grains remained separate and distinct.

In contrast, ordinary long grain rice was prepared by combining one cup of the rice with two cups of cold water, 1 teaspoon salt and 1 tablespoon butter in a saucepan and bringing to a boil. The heat was then reduced to medium-low and cooking continued for 12–14 minutes, or until all the liquid was absorbed. Extreme care must be exercised in the last few minutes of cooking to prevent scorching or sticking caused by overcooking. The rice thus prepared had a soft texture with fully expanded kernels that stuck to each other, and a flavor which was bland. If sufficient care was not maintained during preparation, the rice may be excessively soft, sticky, mushy or otherwise not very palatable. Delays after preparation followed by reheating resulted in a rice which was more soggy and sticky.

The preparation of long grain parboiled rice was essentially similiar to that of long grain non-parboiled rice, with the exception of a 20–25 minute cooking time for the parboiled rice. The same careful preparation practices must be observed to insure acceptable texture and flavor. When properly prepared, parboiled rice had a firm texture and the kernels were separate and distinct. Undercooking resulted in hard, brittle kernels, while overcooking gave a scorched, dry rice. Delays after preparation followed by reheating also resulted in a rice which was more soggy and sticky.

Instant rice (precooked and dried) was prepared by bringing water, butter, and salt to a boil in a saucepan, stirring in the rice (equal in volume to the water used), covering and removing from the heat. After standing in the pan for 5 minutes, the rice was stirred and was ready to serve. The prepared instant rice was somewhat mealy, starchy and quite soft. Relative care must be maintained during the preparation of instant rice in that measurements of rice and water must be exact to prevent soggy or only partially rehydrated kernels. Delays after preparation followed by reheating resulted in a rice which was more starchy, sticky and tended to clump more.

A precooked frozen rice was obtained by cooking ordinary long grain rice in water to gelatinize the rice and hydrate it to approximately 65% moisture, followed by freezing the rice. This precooked frozen rice was prepared for consumption by heating two cups of the frozen rice with one third cup of water and one tablespoon of butter for 5–8 minutes to raise the temperature of the rice to about 150°–180° F. The resulting rice had a bland flavor and a soft texture with fully expanded kernels which tended to stick to each other. Delays after preparation followed by reheating resulted in a softer and stickier rice which tended to clump more.

What is claimed is:

1. A process for preparing a pre-cooked frozen rice product which upon reheating possesses tolerance to preparation variations while still resulting in a reheated rice which exhibits distinct grains with a firm but tender texture, but without mushy, soft, sticky or gummy characteristics comprising:
   a. hydrating a parboiled rice to a moisture content of about 55% to 70%, the hydration being carried out at temperatures greater than about 150° F;
   b. cooling said hydrated rice to a temperature between about 35° F. and 95° F. within about 30 minutes following hydration; and
   c. freezing said cooled rice to a temperature below about 20° F. in a period of time less than about 30 minutes so as to avoid a significant amount of rupturing of the cells of the rice and wherein during freezing loss of more than 5% of the moisture content of the rice is avoided.

2. Process of claim 1 wherein the cooled rice is frozen in less than 10 minutes.

3. Process of claim 2 wherein the cooled rice is frozen to a temperature below about 10° F.

4. Process of claim 2 wherein during cooling loss of more than 5% of the moisture content of the rice is avoided.

5. Process of claim 4 wherein the hydrated rice is cooled within about 10 minutes following hydration.

6. Process of claim 5 wherein the hydrated rice is cooled to a temperature between 40° F. and 80° F.

7. Process of claim 6 wherein the parboiled rice is hydrated at temperatures between about 200° F. and about 212° F.

8. Process of claim 7 wherein the parboiled rice is hydrated to a moisture content of about 61% to 68%.

9. Process of claim 5 wherein the hydration is carried out in less than 60 minutes.

10. Process of claim 9 wherein the water used to hydrate the parboiled rice contains an effective amount of an ingredient which aids in the hydration of the rice.

11. Process of claim 5 wherein the starch of the parboiled rice is at least 90% gelatinized.

12. Process of claim 11 wherein the parboiled rice has been dried to a moisture content between about 7 and 13%.

13. Process of claim 5 further comprising adding frozen vegetables to the frozen rice.

* * * * *